US012748854B2

(12) United States Patent
Ezrielev et al.

(10) Patent No.: US 12,748,854 B2
(45) Date of Patent: Sep. 29, 2026

(54) SYSTEM AND METHOD FOR DETECTING ADVERSARIAL INTERFERENCE WITH DATA PROCESSING SYSTEMS

(71) Applicant: Dell Products L.P., Round Rock, TX (US)

(72) Inventors: Ofir Ezrielev, Be'er Sheva (IL); Tomer Kushnir, Omer (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 362 days.

(21) Appl. No.: 18/309,249

(22) Filed: Apr. 28, 2023

(65) Prior Publication Data

US 2024/0362338 A1 Oct. 31, 2024

(51) Int. Cl.

*G06F 21/57* (2013.01)
*G06F 21/55* (2013.01)
*H04L 9/40* (2022.01)

(52) U.S. Cl.

CPC .......... *G06F 21/577* (2013.01); *G06F 21/554* (2013.01); *H04L 63/1416* (2013.01)

(58) Field of Classification Search

CPC ... G06F 21/577; G06F 21/554; H04L 63/1416
See application file for complete search history.

(56) References Cited

U.S. PATENT DOCUMENTS 6,742,128 B1 5/2004 Joiner
7,159,210 B2 1/2007 Griffin
7,908,653 B2 3/2011 Brickell
8,368,915 B1 2/2013 Feeser
8,516,596 B2 8/2013 Sandoval
(Continued)

FOREIGN PATENT DOCUMENTS

WO WO-2022101656 A1 * 5/2022 ............ H04W 24/10

OTHER PUBLICATIONS

Wang, Haozhe, et al. "A graph neural network-based digital twin for network slicing management." IEEE Transactions on Industrial Informatics 18.2 (2020): 1367-1376. (11 Pages).
(Continued)

*Primary Examiner* — Catherine Thiaw
*Assistant Examiner* — Daniel Elahian
(74) *Attorney, Agent, or Firm* — WOMBLE BOND DICKINSON (US) LLP

(57) ABSTRACT

Methods and systems for monitoring security of data processing systems throughout a distributed environment are disclosed. To monitor security of data processing systems, a system may include a security manager and one or more data processing systems. The security manager may host a digital twin of each data processing system to simulate operations performed by the corresponding data processing system. The security manager may compare operations performed by a data processing system to operations performed by a digital twin of the data processing system. Differences in the operations performed by the data processing system and the digital twin may indicate the presence of adversarial interference with the data processing system. Data processing systems found to be performing unexpected operations may be subject to further analysis and, if needed, remedial action.

20 Claims, 8 Drawing Sheets

(56) References Cited

U.S. PATENT DOCUMENTS

| | | | | |
|---|---|---|---|---|
| 10,540,960 | B1 | 1/2020 | Jones | |
| 11,119,882 | B2 | 9/2021 | Rakshit | |
| 11,184,401 | B2 | 11/2021 | Crabtree | |
| 11,541,919 | B1 | 1/2023 | Neal, Jr. | |
| 11,716,241 | B1 | 8/2023 | Joseph | |
| 11,750,657 | B2 | 9/2023 | Hader | |
| 11,907,407 | B2 | 2/2024 | Hadar | |
| 11,966,820 | B2 | 4/2024 | Ghatage | |
| 12,299,430 | B2 | 5/2025 | Cardozo | |
| 12,613,958 | B2 * | 4/2026 | Bercovitz | G06F 21/554 |
| 2005/0010819 | A1 | 1/2005 | Williams | |
| 2006/0080656 | A1 * | 4/2006 | Cain | G06F 8/65 434/118 |
| 2008/0016339 | A1 | 1/2008 | Shukla | |
| 2008/0282345 | A1 | 11/2008 | Beals | |
| 2010/0031308 | A1 | 2/2010 | Khalid | |
| 2013/0152047 | A1 | 6/2013 | Moorthi | |
| 2014/0081925 | A1 * | 3/2014 | Haeberle | G06F 16/174 707/E17.009 |
| 2015/0026767 | A1 | 1/2015 | Sweet | |
| 2015/0046125 | A1 | 2/2015 | Jagiella | |
| 2015/0089502 | A1 | 3/2015 | Horovitz | |
| 2016/0308895 | A1 | 10/2016 | Kotler | |
| 2017/0041317 | A1 | 2/2017 | Kurian | |
| 2017/0041322 | A1 | 2/2017 | Kurian | |
| 2017/0060607 | A1 | 3/2017 | Hollinger | |
| 2017/0214701 | A1 | 7/2017 | Hasan | |
| 2019/0034636 | A1 | 1/2019 | Gopinath | |
| 2019/0173919 | A1 | 6/2019 | Irimie | |
| 2019/0196952 | A1 | 6/2019 | Manchiraju | |
| 2019/0213104 | A1 | 7/2019 | Qadri | |
| 2019/0349426 | A1 | 11/2019 | Smith | |
| 2020/0041997 | A1 | 2/2020 | Tuukkanen | |
| 2020/0048866 | A1 | 2/2020 | Weber | |
| 2020/0081445 | A1 | 3/2020 | Stetson | |
| 2020/0092322 | A1 | 3/2020 | Boss | |
| 2020/0235998 | A1 * | 7/2020 | Madhavan | H04L 41/0896 |
| 2020/0250295 | A1 | 8/2020 | Padmanabhan | |
| 2020/0356463 | A1 * | 11/2020 | Jaros | G06F 11/3688 |
| 2020/0411168 | A1 | 12/2020 | Thomas | |
| 2021/0097186 | A1 | 4/2021 | Mandal | |
| 2021/0103795 | A1 * | 4/2021 | Buesser | G06N 20/00 |
| 2021/0168175 | A1 | 6/2021 | Crabtree | |
| 2021/0211438 | A1 | 7/2021 | Trim | |
| 2021/0248229 | A1 | 8/2021 | Kras | |
| 2021/0273978 | A1 | 9/2021 | Hadar | |
| 2021/0366269 | A1 * | 11/2021 | Soppin | G08B 21/02 |
| 2021/0374032 | A1 | 12/2021 | Rakshit | |
| 2022/0114310 | A1 | 4/2022 | Berti | |
| 2022/0137611 | A1 * | 5/2022 | Naito | G05B 23/0221 706/12 |
| 2022/0197231 | A1 | 6/2022 | Kim | |
| 2022/0210200 | A1 | 6/2022 | Crabtree | |
| 2022/0253534 | A1 | 8/2022 | Biswas | |
| 2022/0299988 | A1 | 9/2022 | Nair | |
| 2022/0327476 | A1 | 10/2022 | Shanmugavelayudam | |
| 2023/0058974 | A1 | 2/2023 | Yan | |
| 2023/0067128 | A1 | 3/2023 | Engelberg | |
| 2023/0077780 | A1 | 3/2023 | Decrop | |
| 2023/0082761 | A1 | 3/2023 | Ruan | |
| 2023/0117225 | A1 | 4/2023 | Porto Guedes | |
| 2023/0161934 | A1 | 5/2023 | Ganesan | |
| 2023/0367911 | A1 | 11/2023 | Balber | |
| 2023/0376236 | A1 | 11/2023 | Langer | |
| 2024/0003242 | A1 | 1/2024 | Ambade | |
| 2024/0077867 | A1 | 3/2024 | Mene | |
| 2024/0089284 | A1 | 3/2024 | Rieger | |
| 2024/0169050 | A1 | 5/2024 | Gehtman | |
| 2024/0177067 | A1 | 5/2024 | Ezrielev | |
| 2024/0273411 | A1 | 8/2024 | Mueck | |
| 2024/0273434 | A1 | 8/2024 | Jiang | |
| 2024/0314158 | A1 | 9/2024 | Bourzikas | |
| 2024/0340216 | A1 | 10/2024 | Singh | |
| 2024/0348664 | A1 | 10/2024 | Mohanram | |
| 2024/0354657 | A1 | 10/2024 | Li | |
| 2024/0362145 | A1 | 10/2024 | Ezrielev | |
| 2024/0364534 | A1 | 10/2024 | Ezrielev | |
| 2025/0007945 | A1 | 1/2025 | Rieger | |
| 2025/0039236 | A1 | 1/2025 | Ignatius | |
| 2025/0133017 | A1 | 4/2025 | Langer | |

OTHER PUBLICATIONS

Almasan, Paul, et al. "Digital twin network: Opportunities and challenges." arXiv preprint arXiv:2201.01144 (2022). (7 Pages).

Hu, Weifei, et al. "Digital twin: A state-of-the-art review of its enabling technologies, applications and challenges." Journal of Intelligent Manufacturing and Special Equipment 2.1 (2021): 1-34. (34 Pages).

Khan, Latif U., et al. "Digital-twin-enabled 6G: Vision, architectural trends, and future directions." IEEE Communications Magazine 60.1 (2022): 74-80. (7 Pages).

Nguyen, Huan X., et al. "Digital twin for 5G and beyond." IEEE Communications Magazine 59.2 (2021): 10-15. (13 Pages).

Wang, Danshi, et al. "The role of digital twin in optical communication: fault management, hardware configuration, and transmission simulation." IEEE Communications Magazine 59.1 (2021): 133-139. (6 Pages).

Pang, Toh Yen, et al. "Developing a digital twin and digital thread framework for an 'Industry 4.0'Shipyard." Applied Sciences 11.3 (2021): 1097. (22 Pages).

Isto, Pekka, et al. "5G based machine remote operation development utilizing digital twin." Open Engineering 10.1 (2020): 265-272. (8 Pages).

Rovira-Sugranes, Arnau, et al. "A review of AI-enabled routing protocols for UAV networks: Trends, challenges, and future outlook." Ad Hoc Networks 130 (2022): 102790. (30 Pages).

Alcaraz, Cristina, and Javier Lopez. "Digital twin: A comprehensive survey of security threats." IEEE Communications Surveys & Tutorials 24.3 (2022): 1475-1503.

Masi, Massimiliano, et al. "Securing critical infrastructures with a cybersecurity digital twin." Software and Systems Modeling 22.2 (2023): 689-707.

Esteban, Jonathan, "Simulating Network Lateral Movements through the CyberBattleSim Web Platform", Diss. Massachusetts Institute of Technology, 2022, pp. 1-66 (66 pages).

Juan R. Trocoso-Pastoriza et al., "Orchestrating Collaborative Cybersecurity: A Secure Framework for Distributed Privacy-Preserving Threat Intelligence Sharing", arXiv:2209.02676v1, Sep. 6, 2022, retrieved from "arXiv preprint arXiv:2209.02676", pp. 1-31 (31 pages).

Thomas Kunz et al., "A Multiagent CyberBattleSim for RL Cyber Operation Agents", 2022 International Conference on Computational Science and Computational Interllogence (SCCI), Las Vegas, NV, USA, 2022, pp. 897-903 (7 pages).

Viadislav D. Veksler et al., "Simulations in Cyber-Security: A Review of Cognitive Modeling of Network Attackers, Defenders, and Users", Frontiers in Psychology, vol. 9, No. 691, May 15, 2018, pp. 1-12 (12 pages).

Igor Kotenko et al., "Agent-based modeling and simulation of botnets and botnet defense", Conference on Cyber Conflict, CCD COE Publications, Tallonn, Estonia, 2010, pp. 21-44 (24 pages).

* cited by examiner

SYSTEM AND METHOD FOR DETECTING ADVERSARIAL INTERFERENCE WITH DATA PROCESSING SYSTEMS

FIELD

Embodiments disclosed herein relate generally to managing security of data processing systems. More particularly, embodiments disclosed herein relate to systems and methods for detecting adversarial tampering with data processing systems throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
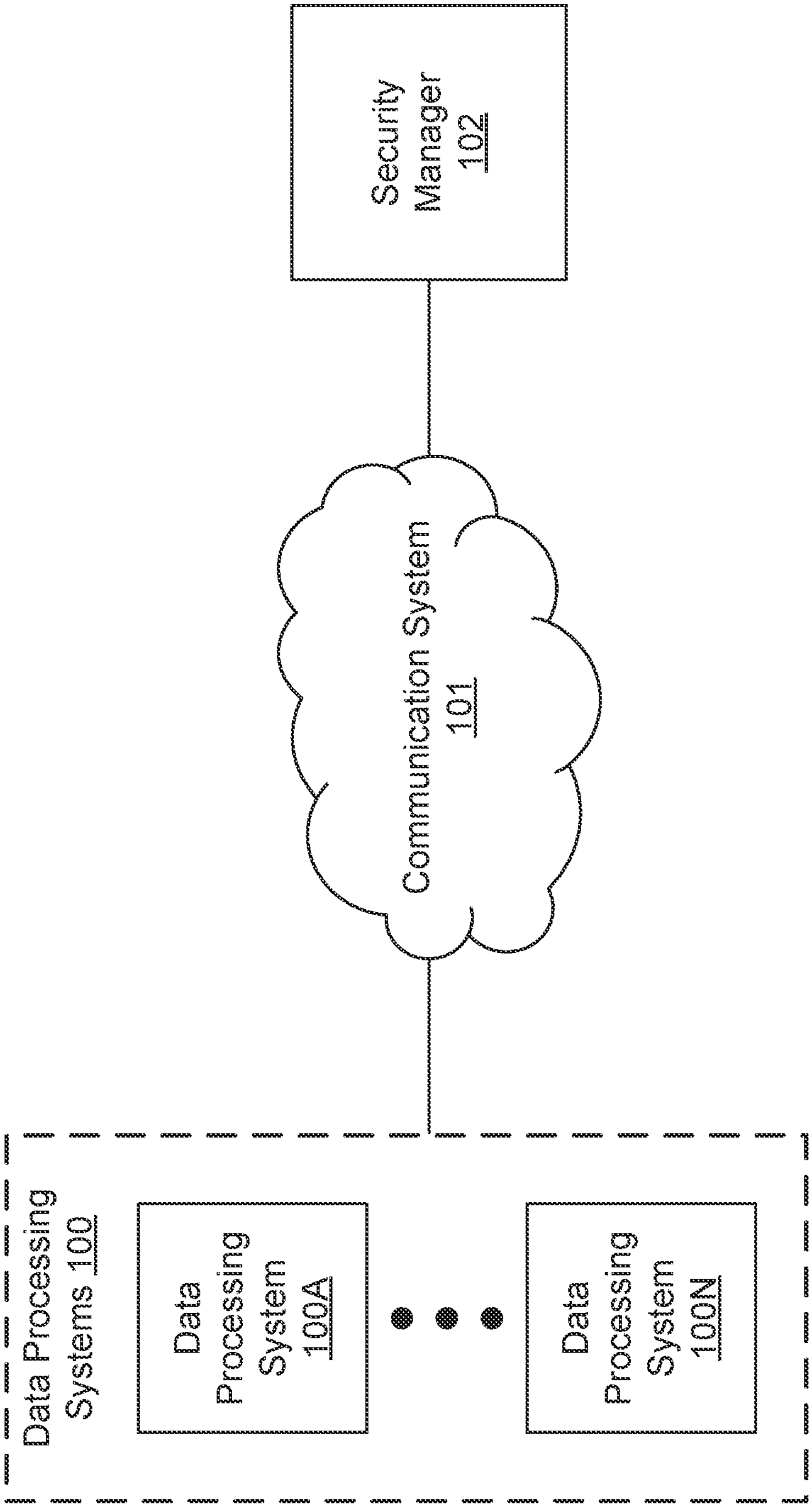
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for monitoring security of data processing systems throughout a distributed environment. To monitor security of data processing systems, the system may include a security manager. The security manager may identify compromised data processing systems and may perform action sets to remediate the compromised data processing systems.

However, some environments may be highly distributed and may include many data processing systems. Monitoring security protocols of each data processing system throughout the distributed environment may consume an undesirable quantity of computing resources, may increase power consumption throughout the system, and/or may lead to delays in operation (e.g., providing computer-implemented services to downstream consumers, etc.) of the data processing systems.

To monitor security of data processing systems while conserving computing resources, reducing power consumption, and avoiding delays in operation of the data processing systems, the security manager may host and operate a digital twin of each data processing system (e.g., an internet of things (IoT) device). The digital twin may simulate operation of the data processing system and may perform identical computations as the data processing system when receiving input data.

The digital twin of the data processing system may operate in concert with a reporting agent hosted by the data processing system. The reporting agent may gather operational data of the data processing system (e.g., a number of computations performed) and may provide an operational report (including the operational data) to the security manager. By operation of the digital twin, the security manager may produce a simulated operational report indicating, for example, an expected number of computations performed by the data processing system under the same conditions (e.g., over a duration of time, etc.) as the operational report.

By comparing the operational report to the simulated operational report, the security manager may determine whether any unexpected computations are being performed by the data processing system. Unexpected computations may indicate adversarial interference with the data processing system by an unauthorized entity.

Data processing systems found to be running unexpected computations may be flagged for additional testing to determine whether they are compromised. Subsequently, data processing systems identified as compromised may be subject to remedial action to restore an acceptable level of security to the system.

Thus, embodiments disclosed herein may provide an improved system for detecting adversarial interference with data processing systems throughout a distributed environment while conserving resources (e.g., computing resources, power, etc.). By monitoring differences between an expected number of computations and a quantification of actual computations performed by the data processing system, data processing systems running any unexpected (and, therefore, potentially adversarial) computations may be identified. Doing so may conserve computing resources and power expenditure throughout a distributed environment, as only data processing systems running unexpected computations are subject to detailed analysis.

In an embodiment, a method of monitoring security of data processing systems throughout a distributed environment by a security manager is provided. The method may include: obtaining an operational report associated with a data processing system of the data processing systems; obtaining a simulated operational report, the simulated operational report being intended to match the operational report when no unauthorized computations are performed by the data processing system; making a determination regarding whether the operational report matches the simulated operational report within a threshold; in a first instance of the determination in which the operational report does not match the simulated operational report within the threshold: adding the data processing system to a list of potentially compromised data processing systems; and performing a first action set based on the list of the potentially compromised data processing systems to identify each data processing system of the list that is compromised.

The method may also include: in a second instance of the determination in which the operational report matches the simulated operational report within the threshold: concluding that the data processing system is not compromised.

The method may also include: prior to obtaining the operational report: identifying operational report criteria indicating data to be provided by the data processing system; and instantiating a reporting agent in the data processing system using the operational report criteria.

The operational report may include a quantification of sub-routines performed by the data processing system at a point in time.

The operational report may include a quantification of sub-routines performed by the data processing system over a duration of time.

Obtaining the simulated operational report may include: obtaining a digital twin of the data processing system; and performing a simulation of operation of the data processing system using the digital twin to obtain an expected number of computations performed by the data processing system.

The digital twin of the data processing system may simulate operation of the data processing system.

The simulated operational report and the operational report may include the same quantity.

Making the determination may include: obtaining a time series representing the computations performed by the data processing system over a duration of time using the operational report; comparing the time series to a simulated time series based on the simulated operational report; and obtaining a difference between the time series and the simulated time series; and comparing the difference to the threshold.

Performing the first action set may include: for each compromised data processing system: performing a second action set to remediate a compromised state of the compromised data processing system.

The data processing system may be an internet of things device associated with at least one sensor positioned to collect data representative of an aspect of an environment.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include monitoring services (e.g., of locations), communication services, and/or any other type of computer-implemented services.

To provide the computer-implemented services, the system may include security manager 102. Security manager 102 may provide all, or a portion of, the computer-implemented services. For example, security manager 102 may provide computer-implemented services to users of security manager 102 and/or other computing devices operably connected to security manager 102.

To facilitate performance of the computer-implemented services, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the computer-implemented services.

All, or a portion, of data processing systems 100 may provide (and/or participate in and/or support the) computer-implemented services to various computing devices operably connected to data processing systems 100. Different data processing systems may provide similar and/or different computer-implemented services.

When providing the computer-implemented services, the system of FIG. 1 may monitor security threats to data processing systems throughout the distributed environment. However, highly distributed environments may include many data processing systems. Analyzing operations performed by each data processing system to monitor security of the distributed environment may consume an undesirable quantity of computing resources, may increase power consumption, and may lead to increased communication system bandwidth usage due to repeated inquiries into the functionality of each data processing system, etc.

In general, embodiments disclosed herein may provide methods, systems, and/or devices for monitoring security of data processing systems while conserving computing resources. To monitor security of data processing systems, the system of FIG. 1 may host and operate a digital twin of each data processing system throughout the distributed environment. Each digital twin may simulate operation of a corresponding data processing system and may obtain an expected number of computations performed based on the simulated operation. The system may compare the expected number of computations to an operational report provided by the data processing system including an actual number of computations performed by the data processing system under the same conditions (e.g., over a specified duration of time, given identical input data, etc.).

If the expected number of computations and the actual number of computations match (e.g., within a threshold to account for aspects of the simulation and/or the environment in which the data processing system operates), the data processing system may be concluded to not be compromised. If the expected number of computations and the actual number of computations do not match within the threshold, the corresponding data processing system may be subject to further analysis to determine if any adversarial interference has occurred. Data processing systems identified as compromised may be remediated to restore security to the system.

To provide the above noted functionality, the system of FIG. 1 may include security manager 102. Security manager 102 may (i) obtain an operational report (e.g., including a quantification of computations performed by a data processing system) associated with the data processing system, (ii) obtain a simulated operational report (e.g., using a digital twin of the data processing system), and/or (iii) determine whether the operational report and the simulated operational report match within a threshold. If the operational report and the simulated operational report match within the threshold, it may be concluded that the data processing system is not compromised. If the operational report and the simulated operational report do not match within the threshold, the data processing system may be added to a list of potentially compromised data processing systems and an action set may be performed based on the list of the potentially compromised data processing systems to identify each data processing system of the list that is compromised.

Figure 2:
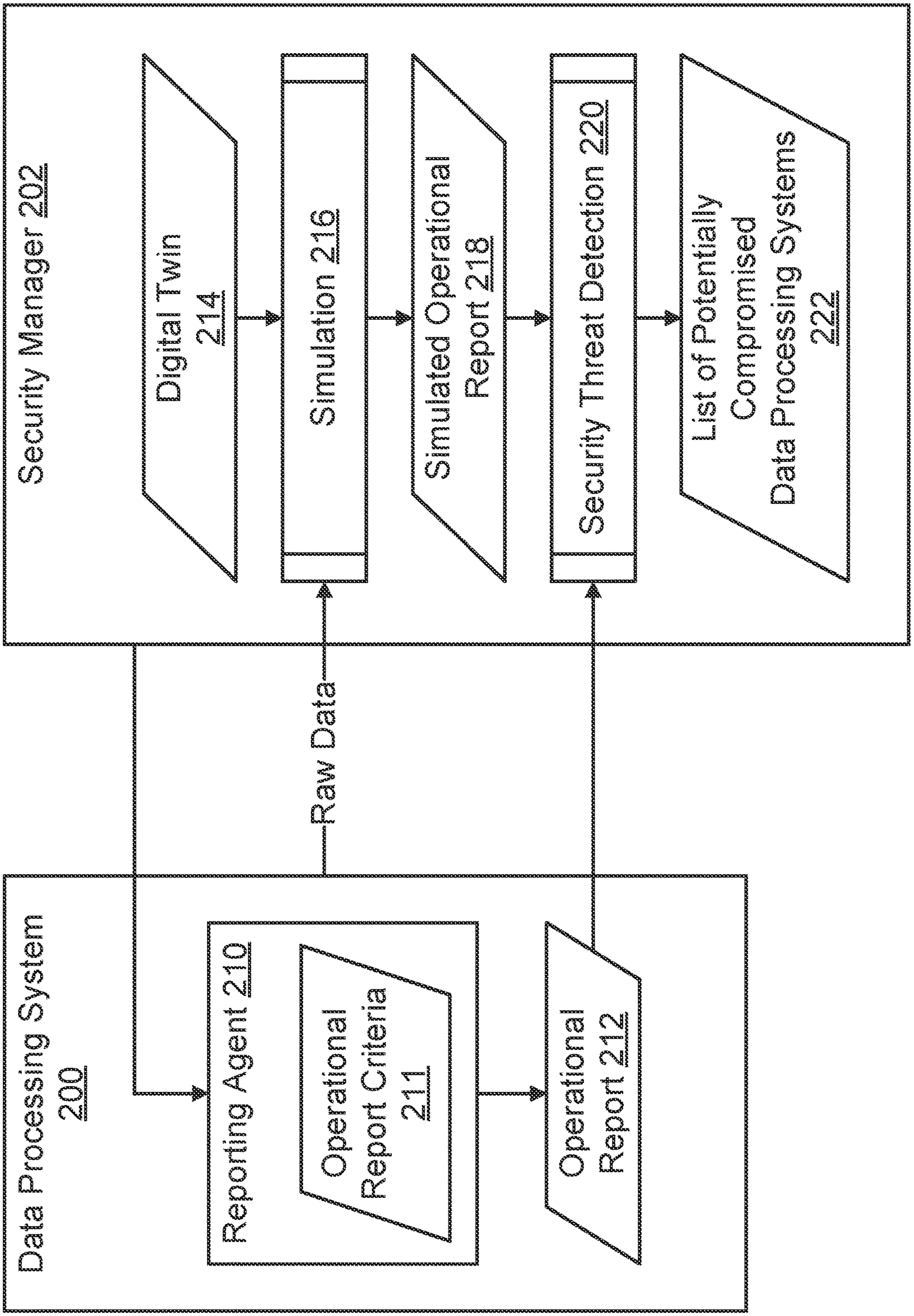
FIG. 2 shows a block diagram illustrating a security manager monitoring security of a data processing system in accordance with an embodiment.
Figure 3A:
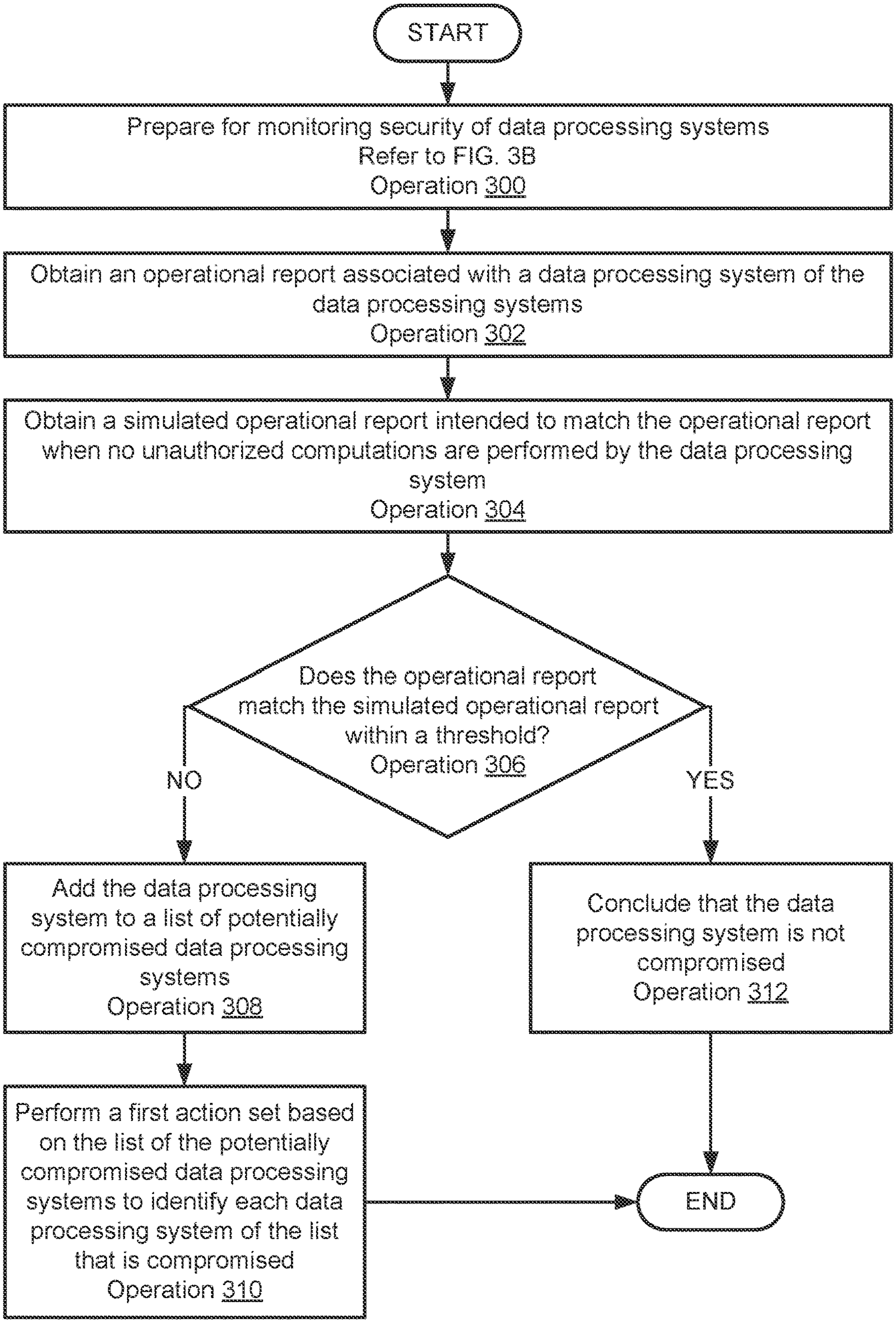
FIG. 3A shows a flow diagram illustrating a method of monitoring security of a data processing system in accordance with an embodiment.
Figure 3B:
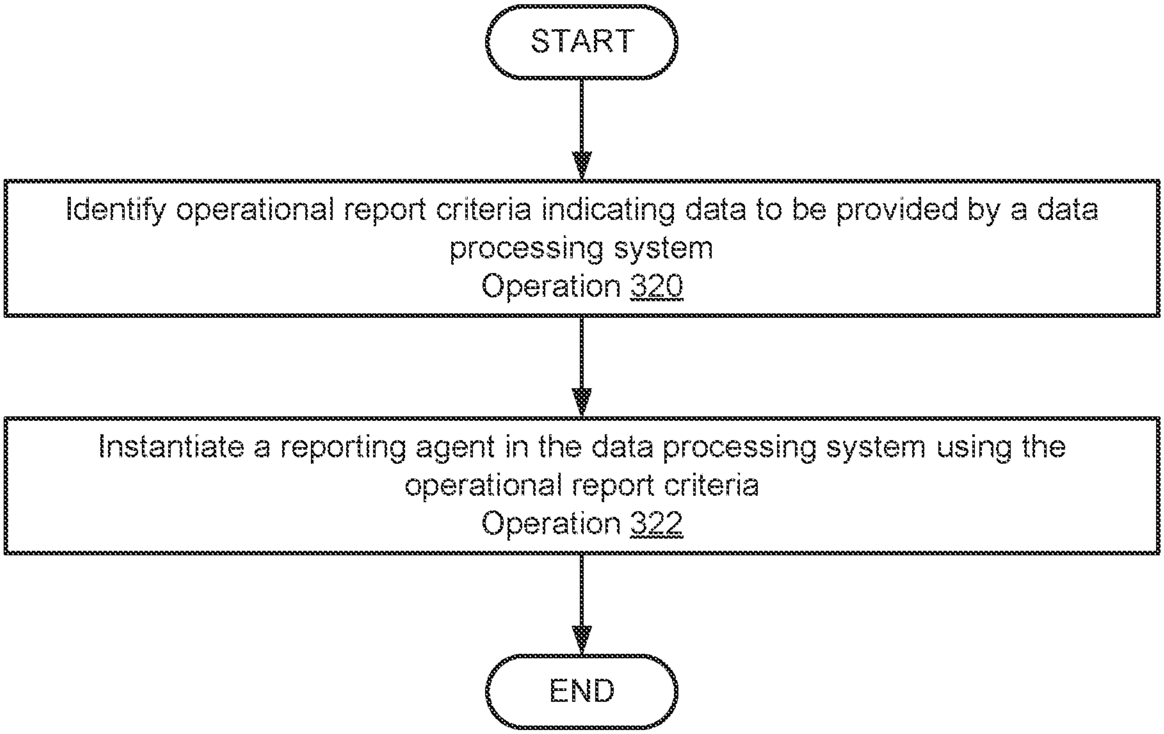
FIG. 3B shows a flow diagram illustrating a method of preparing to monitor security of a data processing system in accordance with an embodiment.

When performing its functionality, security manager 102 and/or data processing systems 100 may perform all, or a portion, of the methods and/or actions shown in FIGS. 2-3B.

Data processing systems 100 and/or security manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 and/or security manager 102 are implemented using an internet of things (IoT) device, which may include a computing device. The IoT device may operate in accordance with a communication model and/or management model known to security manager 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIG. 2.

FIG. 2 shows a block diagram of security manager 202 monitoring security of data processing system 200 in accordance with an embodiment. Security manager 202 may be similar to security manager 102 shown in FIG. 1. In FIG. 2, security manager 202 may be connected to data processing system 200 via a communication system (not shown). Data processing system 200 may be similar to any of data processing systems 100 shown in FIG. 1. Communications between security manager 202 and data processing system 200 are illustrated using lines terminating in arrows.

As discussed above, security manager 202 may perform computer-implemented services by monitoring security of data processing system 200.

To monitor security of data processing system 200, security manager 202 may deploy reporting agent 210 to data processing system 200. Reporting agent 210 may include a data structure (e.g., operational report criteria 211) specifying instructions for generating operational report 212 and providing operational report 212 to security manager 202. Operational report criteria 211 may indicate a type and quantity of data to encapsulate in operational report 212, a schedule for providing operational report 212 to security manager 202, and/or other criteria. Reporting agent 210 may gather, for example, a quantification of computations (e.g., sub-routines) performed by data processing system 200 during normal operation of data processing system 200. Operational report criteria 211 may instruct reporting agent 210 to gather the number of computations over a duration of time, at a particular point in time, and/or via any other schedule. The quantification of the computations may be added to operational report 212 and operational report 212 may be provided to security manager 202.

As shown in FIG. 2, data processing system 200 may also provide raw data to security manager 202. The raw data may include any data collected from sensors associated with data processing system 200 and/or other data. Data processing system 200 may be an internet of things (IoT) device associated with any number of sensors positioned to collect data representative of an aspect of an environment. For example, data processing system 200 may be associated with multiple temperature sensors positioned throughout an ambient environment and the raw data may include temperature measurements collected over a duration of time. Data processing system 200 may process this data to provide computer-implemented services such as, for example, anomaly detection services (not shown).

Security manager 202 may host and operate digital twin 214. Digital twin 214 may include a data structure with instructions to simulate operation of data processing system 200 while performing the computer-implemented services. Therefore, security manager 202 may perform simulation 216 process using the raw data provided by data processing system 200 and digital twin 214. By feeding the raw data into digital twin 214, security manager 202 may obtain simulated operational report 218. Simulated operational report 218 may be intended to match operational report 212 when no unauthorized computations are performed by data processing system 200. Therefore, simulated operational report 218 and operational report 212 may include the same quantity (e.g., a number of sub-routines, etc.).

Security manager 202 may perform security threat detection 220 process using operational report 212 (provided by data processing system 200 via instructions executed by reporting agent 210) and simulated operational report 218. Security threat detection 220 process may include determining whether operational report 212 and simulated operational report 218 match within a threshold. The threshold may allow for inconsistencies between operation of digital twin 214 and data processing system 200 to an extent considered acceptable by security manager 202, a downstream consumer of the computer-implemented services, and/or any other entity.

If operational report 212 matches simulated operational report 218 within the threshold, security manager 202 may conclude that data processing system 200 is not compromised (not shown). If operational report 212 does not match simulated operational report 218 within the threshold, security manager 202 may add data processing system 200 to list of potentially compromised data processing systems 222.

Security manager 202 (and/or another entity) may perform additional actions to verify the compromised state of each data processing system included in list of potentially compromised data processing systems 222. Any data processing systems of list of potentially compromised data processing systems 222 found to be compromised may be subject to further remedial actions (not shown).

In an embodiment, security manager 202 is implemented using a processor adapted to execute computing code stored on a persistent storage that when executed by the processor performs the functionality of security manager 202 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to monitor security of data processing systems in a distributed environment. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of monitoring security of a data processing system in accordance with an embodiment is shown. The method may be performed, for example, by a security manager, data processing system, and/or any other device.

At operation 300, monitoring security of data processing systems is prepared for. Preparing to monitor security of the data processing systems may include: (i) identifying operational report criteria indicating data to be provided by a data processing system, and/or (ii) instantiating a reporting agent in the data processing system using the operational report criteria. Refer to FIG. 3B for additional information regarding preparing to monitor security of the data processing system.

At operation 302, an operational report associated with a data processing system is obtained. Obtaining the operational report may include receiving the operational report in the form of a message over a communication system. The operational report may also be obtained by accessing a database (locally or offsite) where operational reports are stored, by reading the operational report from storage, and/or via other methods. The operational report may be obtained according to a schedule indicating regular transmissions of operational reports (e.g., once per hour, once per day, etc.), upon request by an entity for the operational report, and/or by following any other previously determined schedule.

At operation 304, a simulated operational report intended to match the operational report when no unauthorized computations are performed by the data processing system is obtained. Obtaining the simulated operational report may include: (i) obtaining a digital twin of the data processing system, and/or (ii) performing a simulation of operation of the data processing system using the digital twin to obtain an expected number of computations performed by the data processing system.

The digital twin may be obtained by reading the digital twin from storage, obtaining the digital twin from an entity responsible for generating and/or managing digital twins, by generating the digital twin (e.g., by obtaining a copy of software executed by the data processing system to perform computer-implemented services), and/or via other methods.

Performing the simulation of the operation of the data processing system may include: (i) obtaining input data for the digital twin, (ii) performing computations using the digital twin and the input data to simulate operation of the data processing system, and/or (iii) obtaining the simulated operational report using operational report criteria and the digital twin.

Input data may be obtained by: (i) receiving a transmission from the data processing system including data provided by one or more sensors associated with the data processing system, (ii) reading the input data from storage, (iii) simulating the input data using an inference model (e.g., a neural network, etc.), (iv) receiving the input data from another entity throughout the distributed environment, and/or via other methods.

Performing the computations using the digital twin and the input data may include feeding the input data into the digital twin and obtaining a simulated output, the simulated output being intended to match an output generated by the data processing system. For example, the data processing system may perform anomaly detection services using surveillance video footage of an environment. In this example, the input data may include the surveillance video footage and the digital twin may perform anomaly detection using the surveillance video footage. The simulated output may include an indication of whether any anomalies exist in the surveillance video footage.

The computations may also be performed by providing the input data to another entity responsible for hosting and operating the digital twin and receiving the simulated output in response from the entity.

To obtain the simulated operational report, a quantification of computations (e.g., sub-routines) performed by the digital twin may be identified. To identify the quantification of the computations, the quantification of the computations may be read from storage (e.g., from a data structure storing data associated with performance of the digital twin), may be obtained from another entity responsible for monitoring the performance of the digital twin, and/or via other methods. The quantification of the computations may be identified for a particular point in time, over a duration of time, and/or using any other criteria specified by the operational report criteria.

At operation 306, it is determined whether the operational report matches the simulated operational report within a threshold. Determining whether the operational report matches the simulated operational report within a threshold may include: (i) obtaining a first quantification associated with a number of computations performed by the data processing system at a point in time, (ii) obtaining a second quantification associated with a number of computations performed at the point in time by the digital twin, (iii) obtaining a difference (e.g., by performing a subtraction operation, etc.) between the first quantification and the second quantification, and/or (iv) comparing the difference to the threshold.

Comparing the difference to the threshold may include obtaining the threshold. The threshold may be obtained by reading the threshold from storage, by obtaining the threshold from another entity, by generating the threshold based on the needs of a downstream consumer, and/or via other methods without departing from embodiments disclosed herein.

To compare the difference to the threshold, a numerical value associated with the difference (and/or any other representation of the difference) may be compared to a numerical value associated with the threshold (and/or any other representation of the threshold).

Figure 4A:
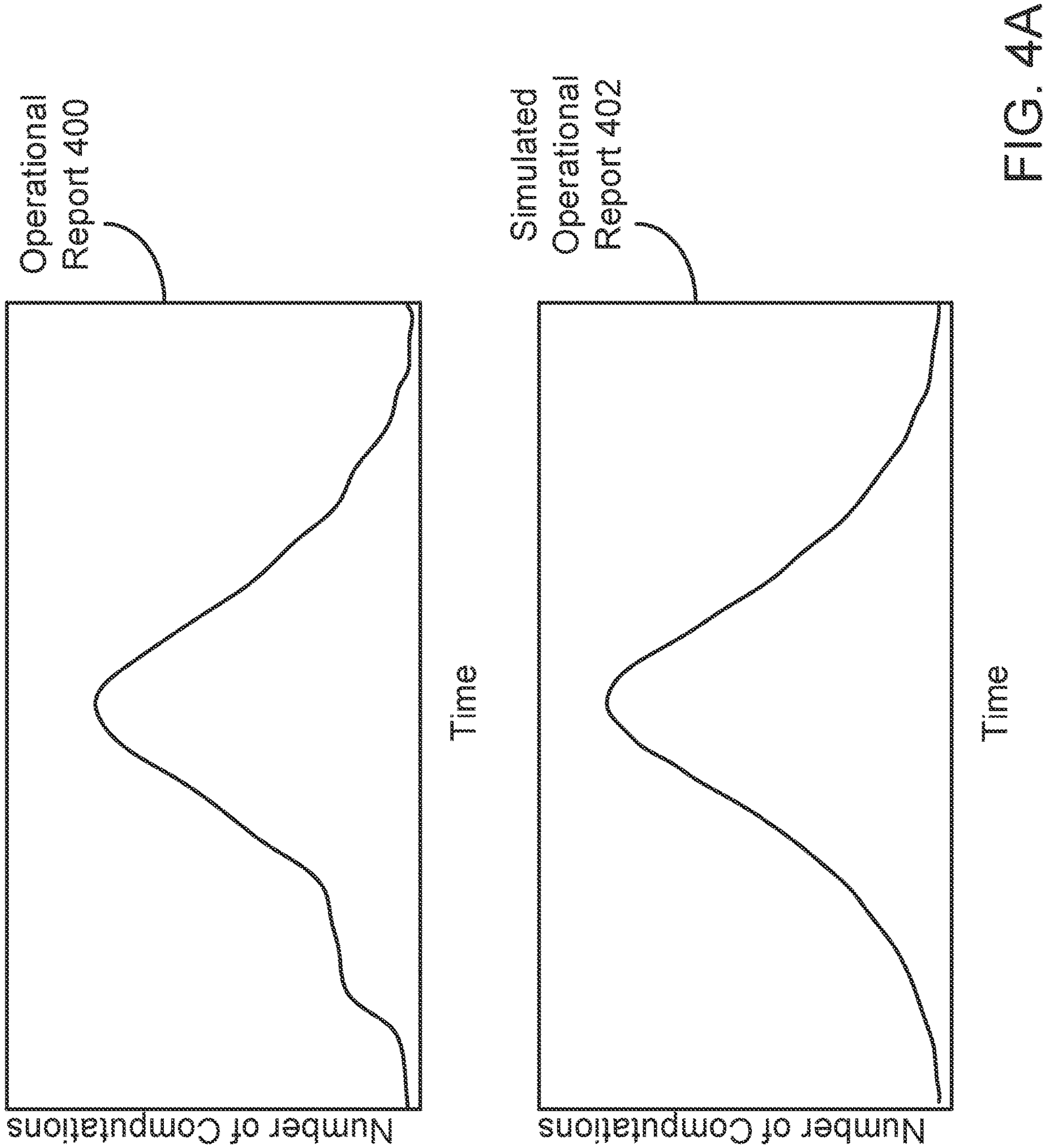
FIGS. 4A-4C show block diagrams illustrating a system in accordance with an embodiment.
Figure 4B:
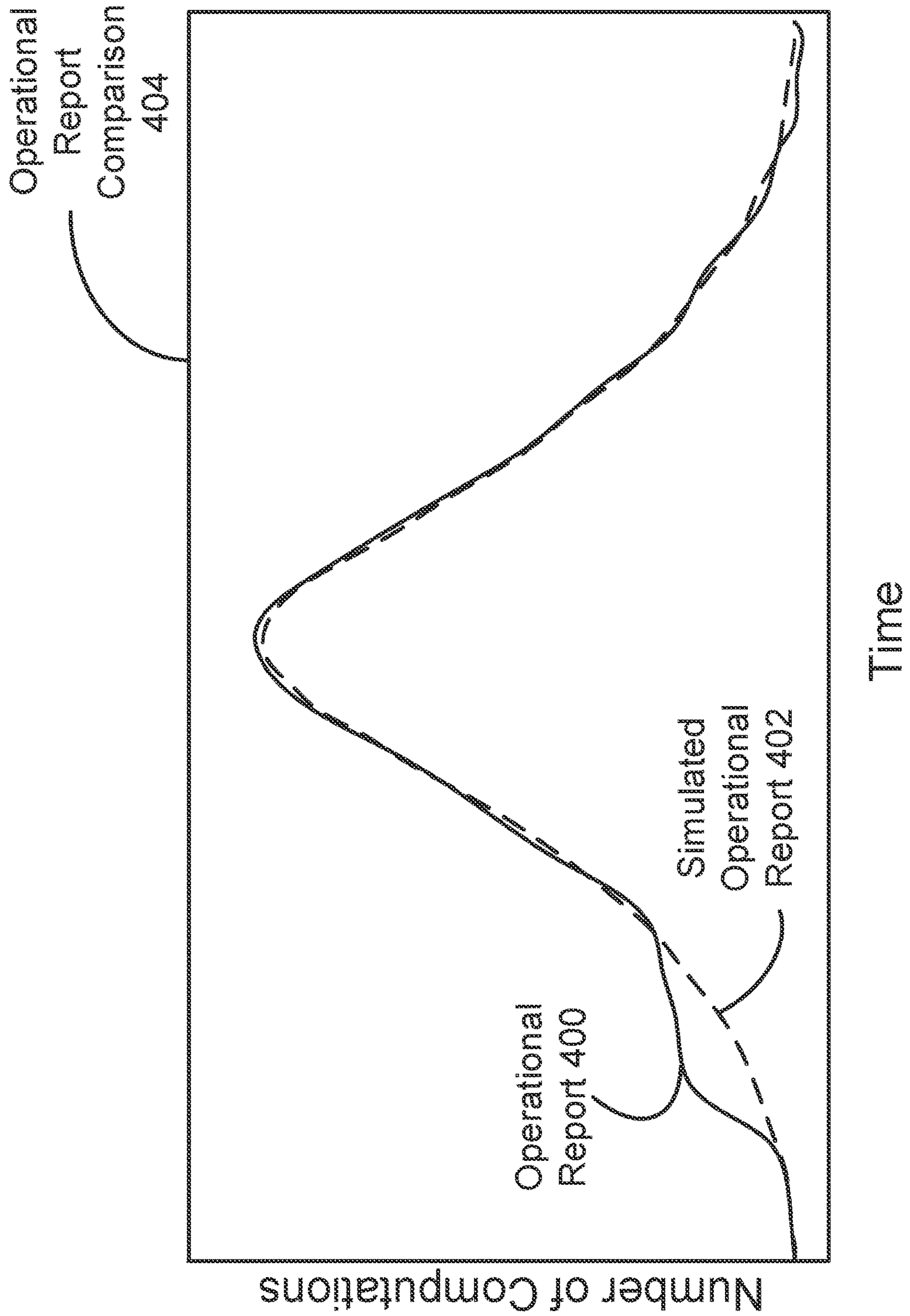
Figure 4C:
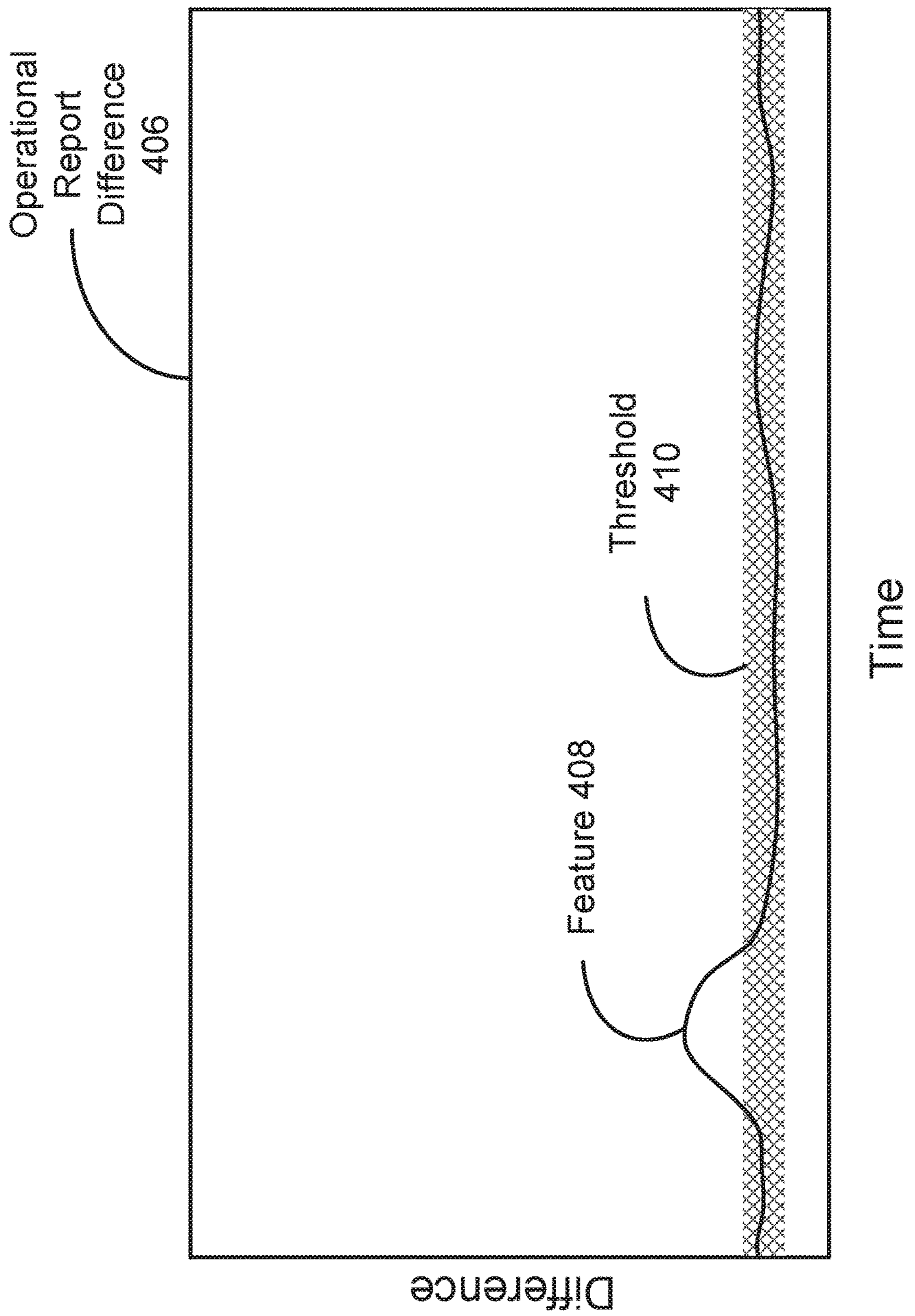

Determining whether the operational report matches the simulated operational report may also include: (i) obtaining a time series representing computations performed by the data processing system over a duration of time using the operational report, (ii) comparing the time series to a simulated time series based on the simulated operational report, (iii) obtaining a difference between the time series and the simulated time series, and/or (iv) comparing the difference to the threshold. Refer to FIGS. 4A-4C for a visual representation of time series comparisons.

Obtaining the time series may include: (i) reading the time series from storage, (ii) receiving the time series in the form of a transmission from the data processing system and/or other entity (e.g., via a reporting agent executing instructions for gathering operational data over a duration of time), (iii) requesting the time series by providing a request to the data processing system and/or another entity, and/or (iv) other actions.

Comparing the time series to the simulated time series may include obtaining the simulated time series and obtaining a difference between the time series and the simulated time series.

Obtaining the simulated time series may include obtaining a quantification of the number of computations performed by the digital twin over the duration of time (e.g., the same duration of time represented by the time series). The quantification of the number of computations performed by the digital twin may be read from storage, obtained from another entity, generated via extracting simulated operational data of the simulated operational report, and/or via other methods.

Obtaining the difference between the time series and the simulated time series may include performing a subtraction of the simulated time series (and/or a graphical representation of the simulated time series) from the time series (and/or a graphical representation of the time series) to identify the presence of features in the time series that are absent from the simulated time series. By doing so, overall patterns in the computations performed by the data processing system may be evaluated while discounting minor offsets (e.g., due to time delays, environmental conditions, etc.) Any identified features may be treated as the difference.

The difference may be compared to the threshold by obtaining a numerical quantification of the difference at each point in time over the duration of time, by obtaining a percent difference between the time series and the simulated time series, and/or by obtaining other representations of the difference and comparing the difference to the threshold. The threshold may indicate a range over which the difference may be considered acceptable. Any features of the difference outside the range may be flagged as exceeding the threshold. Refer to FIG. 4C for a visual representation of the threshold.

If the operational report matches the simulated operational report within the threshold, the method may proceed to operation 312. If the operational report does not match the simulated operational report within the threshold, the method may proceed to operation 308.

At operation 308, the data processing system is added to a list of potentially compromised data processing systems. Adding the data processing system to the list may include generating a data structure and encapsulating an identifier associated with the data processing system in the newly generated data structure. The identifier associated with the data processing system may also be encapsulated in an existing data structure, the existing data structure being modified as needed to generate the list. Adding the data processing system to the list may also include providing the identifier associated with the data processing system (and/or instructions for adding the data processing system to the list) to another entity responsible for managing the list.

At operation 310, a first action set is performed based on the list of the potentially compromised data processing systems to identify each data processing system of the list that is compromised. Performing the first action set may include performing any number of additional security intervention processes to determine whether the data processing system is compromised. The additional security intervention processes may include isolating the data processing system from the rest of the system and performing a detailed review of unexpected computations performed by the data processing system. If the unexpected computations are identified as malicious, the data processing system may be concluded to be compromised.

Performing the first action set may also include performing a second action set to remediate a compromised state of the compromised data processing system. Remediating the compromised state may include: (i) re-imaging software of the data processing system, (ii) powering off the data processing system for a duration of time, (iii) flagging the data processing system as a compromised data processing system, and/or other actions without departing from embodiments disclosed herein.

The method may end following operation 310.

Returning to operation 306, the method may proceed to operation 312 if the operational report does not match the simulated operational report within the threshold.

At operation 312, it is concluded that the data processing system is not compromised. Concluding that the data processing system is not compromised may include removing the data processing system from the list of potentially compromised data processing systems, marking the data processing system as not compromised, transmitting a notification to other entities throughout the distributed environment that the data processing system is not compromised, and/or other actions.

To remove the data processing system from the list, the identifier associated with the data processing system may be deleted from the data structure representing the list and/or a notification may be transmitted to another entity including instructions for deleting the identifier from the list.

The method may end following operation 312.

Turning to FIG. 3B, a flow diagram illustrating a method of preparing to monitor security of data processing systems in accordance with an embodiment is shown. The method may be performed, for example, by a security manager, data processing system, and/or any other device. The operations performed in FIG. 3B may be an expansion of operation 300 in FIG. 3A.

At operation 320, operational report criteria are identified, the operational report criteria indicating data to be provided by a data processing system. Identifying the operational report criteria may include reading the operational report criteria from storage, obtaining the operational report criteria in the form of a transmission from another entity, generating the operational report criteria, and/or other actions.

Generating the operational report criteria may include determining the type and quantity of operational data required (e.g., a quantification of sub-routines performed by the data processing system) and/or a schedule for obtaining the operational data (e.g., once every hour, etc.). The type of operational data, the quantity of operational data, and/or the schedule for obtaining the operational data may be determined based on the needs of a downstream consumer, according to historical data indicating a frequency of historical security issues over time, and/or based on any other data. Once the operational report criteria are determined, instructions may be generated for obtaining operational data in accordance with the operational report criteria and the instructions may be encapsulated in a data structure.

At operation 322, a reporting agent is instantiated in the data processing system using the operational report criteria.

Instantiating the reporting agent may include obtaining the reporting agent and/or providing the reporting agent to the data processing system. The reporting agent may be obtained by reading the reporting agent from storage, receiving the reporting agent via a transmission from another entity, generating the reporting agent, and/or other via other methods.

Generating the reporting agent may include obtaining instructions for implementing the operational report criteria and encapsulating the instructions in a data structure. The method may end following operation 322.

Turning to FIG. 4A, consider a scenario in which a data processing system provides operational report 400 to a security manager. Operational report 400 may include a graphical representation of the number of computations performed by the data processing system over a duration of time. The security manager may generate, using a digital twin of the data processing system, simulated operational report 402. Simulated operational report 402 may include a graphical representation of the number of computations expected to be performed by the data processing system over the duration of time.

Turning to FIG. 4B, the security manager may compare operational report 400 and simulated operational report 402 by superimposing the graphical representations as shown by operational report comparison 404. In FIG. 4B, the graphical representation of operational report 400 is shown as a solid line and the graphical representation of simulated operational report 402 is shown as a dashed line.

Turning to FIG. 4C, operational report difference 406 shows a graphical representation of a difference between operational report 400 and simulated operational report 402. The difference may be obtained, for example, by subtracting the graphical representation of simulated operational report 402 from the graphical representation of operational report 400.

Threshold 410 is shown superimposed over operational report difference 406. Threshold 410 may indicate an acceptable amount of deviation between operational report 400 and simulated operational report 402. As shown by FIG. 4C, feature 408 may exceed threshold 410 and, therefore, may indicate that operational report 400 indicates that unexpected computations have been performed by the data processing system. The identification of feature 408 may lead the security manager to perform additional processes to determine whether the data processing system is compromised.

Figure 5:
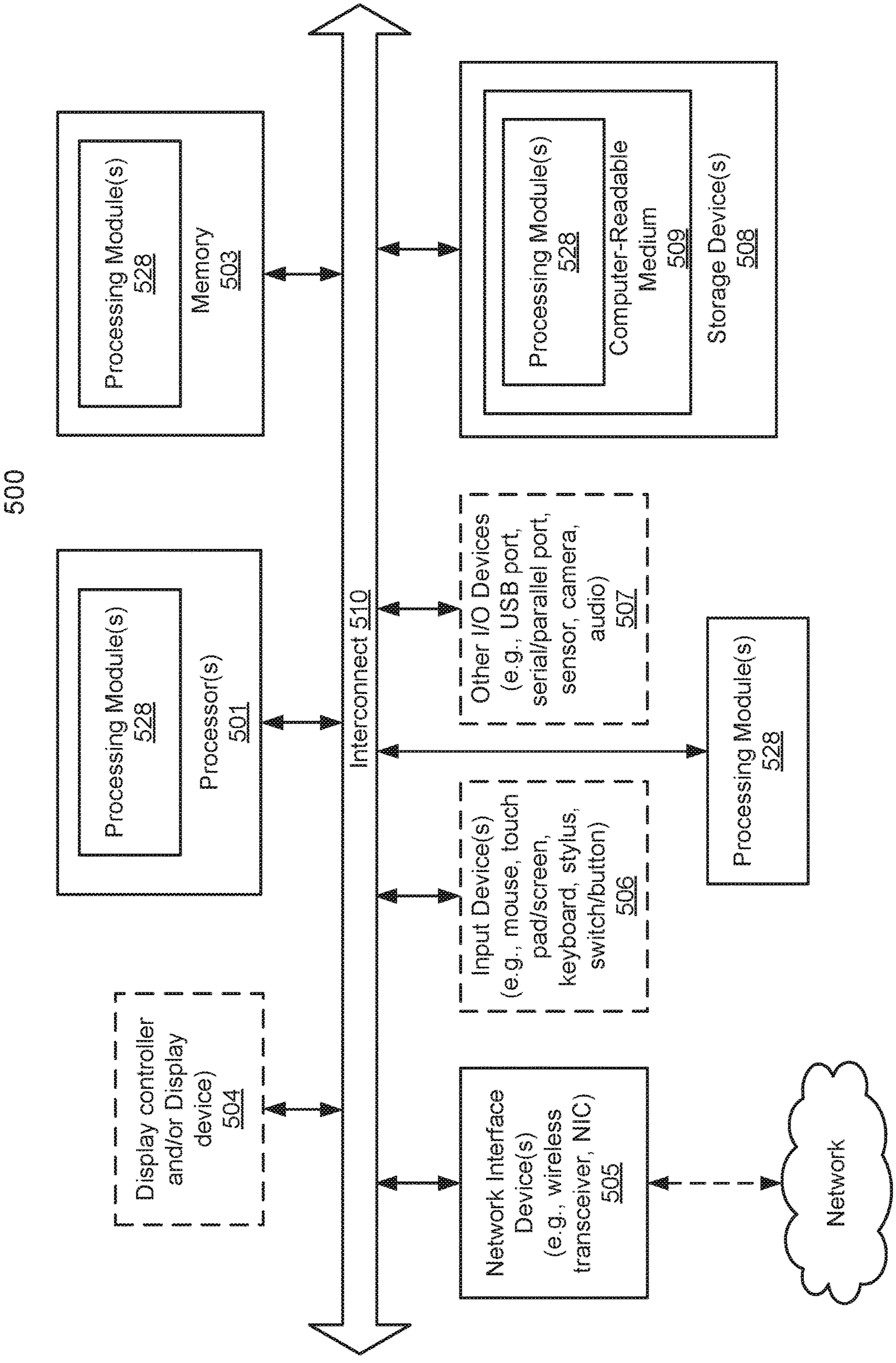
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of monitoring security of data processing systems throughout a distributed environment by a security manager, the method comprising:

obtaining an operational report associated with a data processing system of the data processing systems, the operational report comprising a number of computations performed by the data processing system during a specified duration of time while experiencing a condition of the distributed environment, and the operational report being obtained based on a schedule specifying a repeating interval for obtaining the operational report, the repeating interval is based on a frequency of historical security issues that impacted the distributed environment over time;

obtaining a simulated operational report, the simulated operational report being based on the condition of the distributed environment at the data processing system during the specified duration of time and intended to match the operational report when no unauthorized computations are performed by the data processing system;

making a determination regarding whether the operational report matches the simulated operational report within a threshold by:

using the operational report to obtain a time series representing the computations performed by the data processing system during the specified duration of time and under the condition of the distributed environment;

using the simulated operational report to obtain a simulated time series during the specified duration of time and under the condition of the distributed environment, obtaining a difference between the time series and the simulated time series; and comparing the difference to the threshold, the threshold being based on the condition of the distributed environment during the specified duration of time in which the data processing system operated;

in a first instance of the determination in which the operational report does not match the simulated operational report within the threshold:

adding the data processing system to a list of potentially compromised data processing systems; and performing a first action set based on the list of the potentially compromised data processing systems to identify each data processing system of the list that is compromised.

2. The method of claim 1, further comprising:

in a second instance of the determination in which the operational report matches the simulated operational report within the threshold:

concluding that the data processing system is not compromised.

3. The method of claim 1, further comprising:

prior to obtaining the operational report:

identifying operational report criteria indicating data to be provided by the data processing system; and instantiating a reporting agent in the data processing system using the operational report criteria.

4. The method of claim 3, where the operational report criteria include a criterion for reporting the condition of the distributed environment as part of input data provided by one or more sensors associated with the data processing system.

5. The method of claim 4, wherein obtaining the simulated operational report comprises:

obtaining a digital twin of the data processing system; and performing, using the digital twin and based on the condition of the distributed environment indicated in the input data, a simulation of operation of the data processing system under the condition of the distributed environment; and obtaining an expected number of computations performed by the data processing system during the specified duration of time and under the condition of the distributed environment.

6. The method of claim 4, wherein the condition of the distributed environment indicated in the input data is obtained by an ambient temperature sensor of the one or more sensors associated with the data processing system.

7. The method of claim 4, wherein the condition of the distributed environment indicated in the input data is obtained by a thermal sensor, of the one or more sensors associated with the data processing system, controlled by an embedded controller of the data processing system.

8. The method of claim 1, wherein the operational report further comprises a quantification of sub-routines performed by the data processing system at a point in time during the specified duration of time.

9. The method of claim 1, wherein the operational report further comprises a quantification of sub-routines performed by the data processing system over the specified duration of time.

10. The method of claim 1, wherein obtaining the simulated operational report comprises:

obtaining a digital twin of the data processing system; and performing a simulation of operation of the data processing system using the digital twin to obtain an expected number of computations performed by the data processing system during the specified duration of time.

11. The method of claim 1, wherein performing the first action set comprises:

for each compromised data processing system:

performing a second action set to remediate a compromised state of the compromised data processing system, the second action set comprising an action selected from a group of actions consisting of:

re-imaging software of the data processing system, and powering off the data processing system for a duration of time.

12. A non-transitory machine-readable medium having instructions stored therein, which when executed by a processor, cause operations for monitoring security of data processing systems throughout a distributed environment by a security manager to be performed, the operations comprising:

obtaining an operational report associated with a data processing system of the data processing systems, the operational report comprising a number of computations performed by the data processing system during a specified duration of time while experiencing a condition of the distributed environment, and the operational report being obtained based on a schedule specifying a repeating interval for obtaining the operational report, the repeating interval is based on a frequency of historical security issues that impacted the distributed environment over time;

obtaining a simulated operational report, the simulated operational report being based on the condition of the distributed environment at the data processing system during the specified duration of time and intended to match the operational report when no unauthorized computations are performed by the data processing system;

making a determination regarding whether the operational report matches the simulated operational report within a threshold by:

using the operational report to obtain a time series representing the computations performed by the data processing system during the specified duration of time and under the condition of the distributed environment;

using the simulated operational report to obtain a simulated time series during the specified duration of time and under the condition of the distributed environment, obtaining a difference between the time series and the simulated time series; and comparing the difference to the threshold, the threshold being based on the condition of the distributed environment during the specified duration of time in which the data processing system operated;

in a first instance of the determination in which the operational report does not match the simulated operational report within the threshold:

adding the data processing system to a list of potentially compromised data processing systems; and performing a first action set based on the list of the potentially compromised data processing systems to identify each data processing system of the list that is compromised.

13. The non-transitory machine-readable medium of claim 12, wherein the operations further comprise:

in a second instance of the determination in which the operational report matches the simulated operational report:

concluding that the data processing system is not compromised.

14. The non-transitory machine-readable medium of claim 12, wherein the operations further comprise:

prior to obtaining the operational report:

identifying operational report criteria indicating data to be provided by the data processing system; and instantiating a reporting agent in the data processing system using the operational report criteria.

15. The non-transitory machine-readable medium of claim 12, wherein the operational report comprises a quantification of sub-routines performed by the data processing system at a point in time during the specified duration of time.

16. The non-transitory machine-readable medium of claim 12, wherein the operational report comprises a quantification of sub-routines performed by the data processing system over the specified duration of time.

17. A system, comprising:

a processor; and a memory coupled to the processor to store instructions, which when executed by the processor, cause operations for monitoring security of data processing systems throughout a distributed environment by a security manager to be performed, the operations comprising:

obtaining an operational report associated with a data processing system of the data processing systems, the operational report comprising a number of computations performed by the data processing system during a specified duration of time while experiencing a condition of the distributed environment, and the operational report being obtained based on a schedule specifying a repeating interval for obtaining the operational report, the repeating interval is based on a frequency of historical security issues that impacted the distributed environment over time;

obtaining a simulated operational report, the simulated operational report being based on the condition of the distributed environment at the data processing system during the specified duration of time and intended to match the operational report when no unauthorized computations are performed by the data processing system;

making a determination regarding whether the operational report matches the simulated operational report within a threshold by:

using the operational report to obtain a time series representing the computations performed by the data processing system during the specified duration of time and under the condition of the distributed environment;

using the simulated operational report to obtain a simulated time series during the specified duration of time and under the condition of the distributed environment, obtaining a difference between the time series and the simulated time series; and comparing the difference to the threshold, the threshold being based on the condition of the distributed environment during the specified duration of time in which the data processing system operated;

in a first instance of the determination in which the operational report does not match the simulated operational report within the threshold:

adding the data processing system to a list of potentially compromised data processing systems; and performing a first action set based on the list of the potentially compromised data processing systems to identify each data processing system of the list that is compromised.

18. The system of claim 17, wherein the operations further comprise:

in a second instance of the determination in which the operational report matches the simulated operational report:

concluding that the data processing system is not compromised.

19. The system of claim 17, wherein the operations further comprise:

prior to obtaining the operational report:

identifying operational report criteria indicating data to be provided by the data processing system; and instantiating a reporting agent in the data processing system using the operational report criteria.

20. The system of claim 17, wherein the operational report comprises a quantification of sub-routines performed by the data processing system at a point in time during the specified duration of time.

* * * * *